(12) United States Patent
Hagan

(10) Patent No.: US 6,254,144 B1
(45) Date of Patent: Jul. 3, 2001

(54) HOSE COUPLING

(75) Inventor: David G. Hagan, South Whitley, IN (US)

(73) Assignee: Kilgore Manufacturing, Columbia City, IN (US)

( * ) Notice: Subject to any disclaimer, the term of this patent is extended or adjusted under 35 U.S.C. 154(b) by 0 days.

(21) Appl. No.: 09/450,977

(22) Filed: Nov. 30, 1999

Related U.S. Application Data

(60) Provisional application No. 60/111,464, filed on Dec. 9, 1998, and provisional application No. 60/110,572, filed on Dec. 2, 1998.

(51) Int. Cl.$^7$ ................................................. F16L 33/20
(52) U.S. Cl. ......................... 285/243; 285/322; 285/323
(58) Field of Search ............................. 285/39, 243, 322, 285/323, 308, 222.1

(56) References Cited

U.S. PATENT DOCUMENTS

| | | | | |
|---|---|---|---|---|
| 3,097,866 | * | 7/1963 | Iversen | 285/322 |
| 4,188,051 | * | 2/1980 | Burge | 285/323 |
| 4,302,036 | * | 11/1981 | Burge | 285/323 |
| 4,303,263 | * | 12/1981 | Legris | 285/323 |
| 4,335,908 | * | 6/1982 | Burge | 285/323 |
| 4,431,216 | * | 2/1984 | Legris | 285/323 |
| 4,627,644 | * | 12/1986 | Ekman | 285/323 |
| 4,712,813 | * | 12/1987 | Passerell et al. | 285/323 |
| 5,230,539 | * | 7/1993 | Olson | 285/243 |
| 5,511,830 | * | 4/1996 | Olson et al. | 285/243 |
| 5,673,945 | * | 10/1997 | Olson | 285/322 |

OTHER PUBLICATIONS

Hand sketches of Don Wehrling, date unknown.

* cited by examiner

Primary Examiner—Eric K. Nicholson
(74) Attorney, Agent, or Firm—E. Victor Indiano

(57) ABSTRACT

A hose coupling secures a flexible hose member having a radially outwardly facing exterior hose surface and a radially inwardly facing interior hose surface. The hose coupling includes a housing having a radially outwardly facing exterior surface and a radially inwardly facing interior surface defining a longitudinal passageway, a first axial end, and a second axial end. The interior surface includes a first ramped portion and a first seating portion. A tube support member has a tube portion disposed in the interior longitudinal passageway of the housing and a base portion fixedly coupled to the housing at the second axial end of the housing. The base portion has a seal seat region, and the tube portion has a radially outwardly facing exterior surface that includes a first grip ring for supporting the interior hose surface. The first grip ring is circumferentially disposed about the exterior hose surface. A seal is disposed between the first seating portion of the housing and the seal seat region of the tube support member. A grip/release mechanism is disposed in the longitudinal passageway of the housing concentrically exteriorly of the tube portion of the tube support member. The grip/release member is axially moveable relative to the housing and has a third axial end, a radially inwardly facing, axially extending interior surface defining an interior longitudinal passageway, and a radially outwardly facing, axially extending exterior surface. The grip/release member interior surface includes a circumferentially disposed sealing grip ring and a circumferentially disposed barbed grip ring disposed toward the third axial end relative to the grip ring. The sealing grip ring exerts a compressive force on the exterior hose surface and the barbed grip ring grips the exterior hose surface by exerting an expansive force. The grip/release mechanism exterior surface includes a second ramped portion.

23 Claims, 7 Drawing Sheets

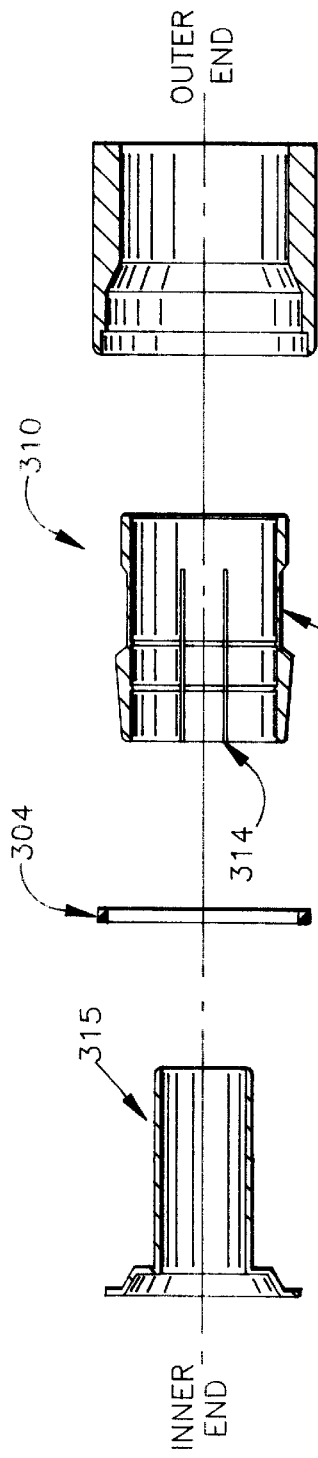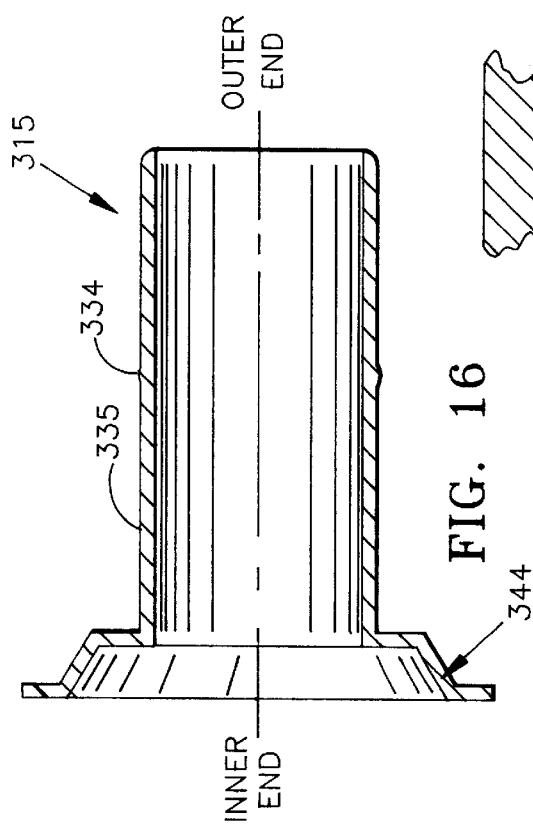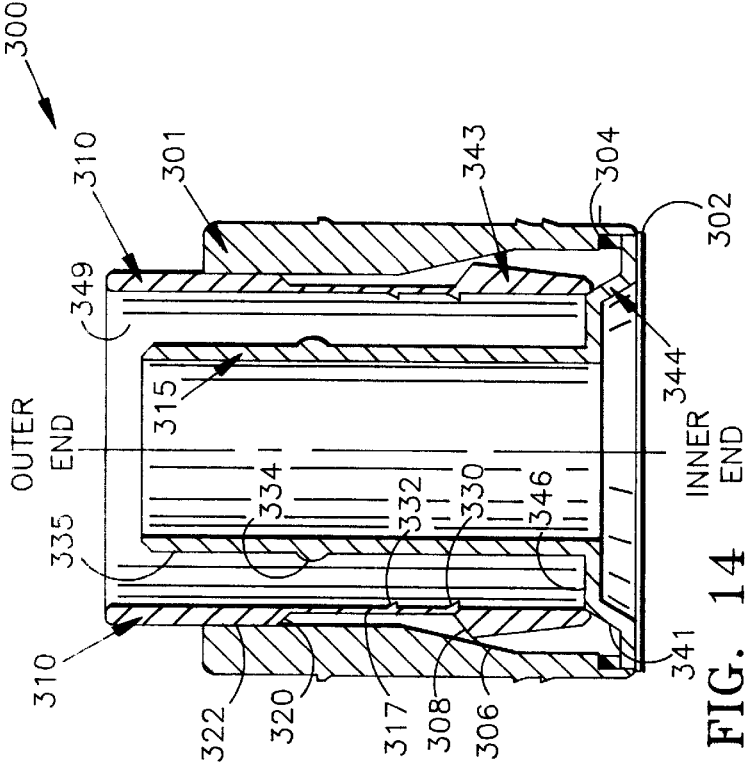

HOSE COUPLING

I. PRIORITY

This application claims the benefit of U.S. Provisional Application No. 60/111,464, filed Dec. 9, 1998, and U.S. Provisional Application No. 60/110,572, filed Dec. 2, 1998.

II. TECHNICAL FIELD OF THE INVENTION

The present invention relates to a hose coupling and more particularly to a relatively inflexible hose coupling to which a flexible hose can be connected. The hose coupling has special adaptability for use in connection with high pressure air hoses of the type that as are used in connection with an air system on a vehicle such as a locomotive, railroad car, or truck and trailer having air brake lines.

III. BACKGROUND OF THE INVENTION

Many circumstances exist wherein a person wishes to couple a flexible hose, such as a flexible air line, to an inflexible coupling, such as a coupling made from steel or brass. These circumstances typically arise in fluid systems that carry a gas or liquid between two points; and fluid systems that employ a gas or air to perform work, such as air brake systems, pneumatic systems and hydraulic systems. One particular circumstance where it is desirable to couple a flexible fluid carrying hose to an inflexible coupling is in the air system of a truck, such as a tractor trailer, or of a railroad car or locomotive.

Large vehicles, and in particular semi-tractors and their trailers, and locomotives and railroad cars use an air system to control braking. In most air brake systems, the air pressure is used to release the shoe of the brake from its engagement with the drum or disk of the brake in order to permit the vehicle to be moved. Most air brakes on trains and trucks are biased with springs or other mechanical means, so that in the absence of air pressure, the shoe will engage the drum (or disk) and thereby place the brake in a "brake on" position, to prevent the vehicle from moving. Air pressure is fed to a pneumatic cylinder within the brake shoe so that when air pressure is applied to the brake shoe, the brake shoe will move away from the drum or disk to disengage the drum or disk, thereby allowing the drum or disk to spin on its axle, thereby allowing the hub and wheel to rotate.

In order to "get air" to the various brake shoes of a multi-wheel vehicle, a large number of air lines must be used. Because the various vehicle components such as the wheels and the frame move in relation to each other, it is desirable to employ a flexible air line to couple the air receiving member (such as the brake shoe) on the wheel to the air provider component (such as a niold mounted on the frame of the trailer). A large number of different types and brands of flexible air lines are currently manufactured and are available from companies such as Gates Rubber, and Dayco Products.

Typically, a coupling is placed on each end of the flexible air hose, to permit the air hose to be coupled to another air system component, such as an air manifold. On a large vehicle, such as a truck, a large quantity of air hoses, and hence a large quantity of air hose couplings are used, typically about 100 or so in a semi-tractor rig.

Known couplings exist that usually include a tube support that is surrounded by a coaxially disposed housing. An O-ring is inserted at the base of the tube support to prevent air leaking therethrough. Couplings of this type have some inherent problems. One problem is the sharp edges on the end of the flexible brake hoses come in contact with the O-rings. This contact can nick or damage the O-ring, thereby creating a leak in the system that causes the system to lose air.

One object of the present invention is to provide a coupling that eliminates the contact between the O-ring and the air hose and which also grips the hose in a manner such that air cannot pass around the hose on its outside or inside.

IV. SUMMARY OF THE INVENTION

In accordance with the present invention, a hose coupling is provided for securing a flexible hose tube member having a radially outwardly facing exterior hose surface and a radially inwardly facing interior hose surface. The hose coupling comprises a first coupling unit that includes a housing, a tube support member and a seal. The tube support member includes a tube portion for supporting the interior hose surface, and a base portion. The base portion is fixedly coupled to the housing. The seal is disposed between the housing and the tube support such that the seal is encapsulated by the combination of the housing and the tube support member. The coupling also includes a grip/release mechanism for retaining the hose. The grip/release mechanism is disposed between the tube portion of the tube support member and the housing, and is movable relative to the first coupling unit.

Preferably, the housing is disposed coaxially and exteriorly concentrically of a grip/release mechanism The grip/release mechanism is itself disposed coaxially, exteriorly, and concentrically of a tube support. A Tefloni sealing ring is disposed between the tube support and the housing. The cartridge is especially adaptable for use in conjunction with air line couplings of the type typically used on large vehicles, such as trucks and locomotives.

One feature of the present invention is that it includes a tube support having at least one radially outwardly extending grip ring formed thereon, and a grip/release mechanism having at least one radially inwardly extending grip ring that is formed thereon. The flexible hose can be selectively and replaceably captured between the tube support and the grip/release mechanism, so that the gripping ring of the tube support engages the interior surface of the flexible hose, and the radially inwardly extending grip ring of the grip/release mechanism engages the hose's exterior surface. This dual, interior-exterior gripping provided by the present invention has the advantage of securely gripping the flexible hose in a manner that retains the flexible hose securely on to the coupling, especially when an axially outwardly directed force is exerted against the hose; but which still permits the hose to be fitted onto and removed from the cartridge with relative ease.

Another feature of the present invention is that the grip/release mechanism is axially movable relative to the tube support. This axial movability is employed by the user to facilitate attachment of the tube to the coupling, and removal of the flexible hose from the coupling.

It is also a feature of the present invention that the grip/release mechanism includes a portion having a plurality of axially extending slots. These slots facilitate the radial expansion and contraction of the grip/release mechanism, which thereby facilitates the attachment of the flexible hose to, and the removal of the flexible hose from the grip/release mechanism.

These and other features of the present invention will become apparent to those skilled in the art through a review of the detailed description and figures set forth below, that set forth the best mode of practicing the invention perceived presently by the Applicant.

V. BRIEF DESCRIPTION OF THE DRAWINGS

FIG. 14 is a sectional view of a fourth embodiment of a coupling;

FIG. 15 is an exploded sectional view of the fourth embodiment of the coupling;

FIG. 16 is a sectional view of the tube support member of the fourth embodiment; and FIG. 17 is an enlarged view of the ring on the tube support member of the fourth embodiment.

VI. DETAILED DESCRIPTION

Figure 1:
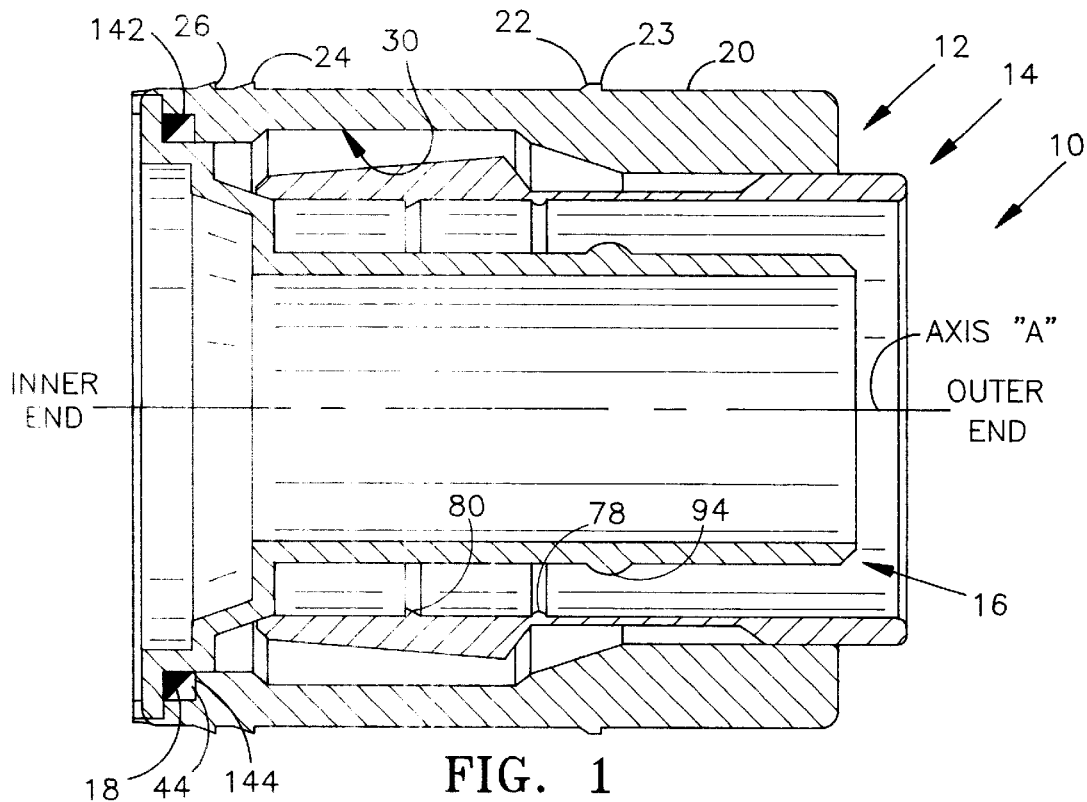
FIG. 1 is a longitudinal, sectional view of the assembled coupling cartridge of the present invention.

The coupling 10 of the present invention is shown in FIGS. 1–10 of the accompanying drawings. Turning now to FIG. 1, the coupling cartridge 10 includes a housing 12 that is disposed coaxially, and concentrically exteriorly of a grip/release mechanism 14 which itself is disposed coaxially and concentrically exteriorly of a tube support 16. A Teflon sealing ring 18 is disposed between the tube support 16 and the housing 12, and is coaxial with the tube support 16 and grip/release mechanism 14. Coupling 10 shown in the drawings is designed for being received in an appropriately sized aperture formed in a manifold. The manifold (not shown) is part of an air system, such as the air brake system of a truck. Housing 12 includes an axially extending, radially outwardly facing surface 20.

All of the three primary elements, housing 12, grip/release mechanism 14, and tube support 16 are preferably made from a corrosion resistant metal such as brass; are generally cylindrically shaped, and have hollow interiors that form longitudinally extending passageways therethrough The three primary elements, housing 12, grip/release mechanism 14 and tube support 16 are disposed concentrically about each other, with each sharing a common longitudinal axis A, that extends between an outer end and an inner end of coupling 10. For purposes of clarity in this application (but not of limitation), the "outer end" is defined as the end that contains the flexible hose tubing, and the inner end is defined as the end of the cartridge that opens toward the interior of the manifold, and does not contain a flexible hose attached to it.

Housing 12 is generally cylindrically shaped, and includes an axially extending, radially outwardly facing cylindrical exterior surface 20. Radially outwardly facing exterior surface 20 includes a series of three circumferential barbed rings 22, 24, and 26 for enabling exterior surface 20 of housing 12 to grip a radially inwardly facing surface of the manifold aperture (not shown), to maintain coupling 10 in a secure, fixedly positioned orientation with respect to the manifold aperture, and hence the manifold (not shown). Each of barbed rings 22, 24, and 26 extend circumferentially, and have an axially outwardly facing point (i.e. 23), to help resist axially outward movement of housing 12 relative to the manifold (not shown).

Figure 2:
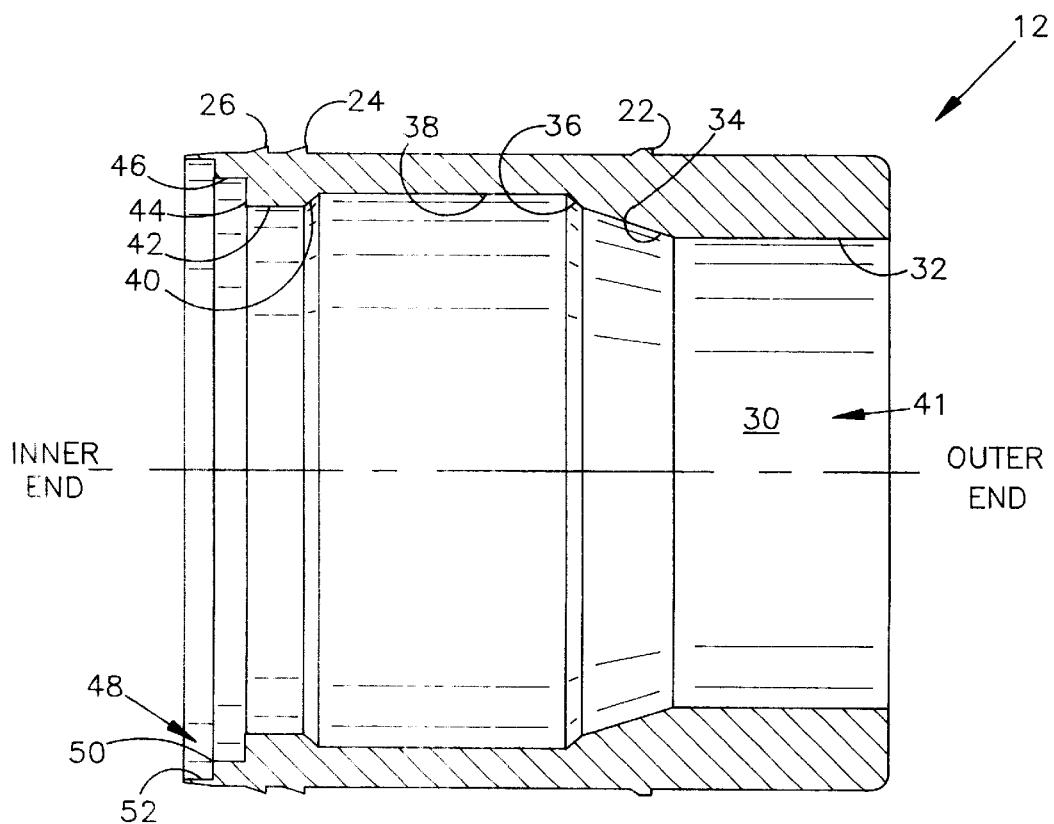
FIG. 2 is a longitudinal sectional view of the housing of the coupling of the present invention.
Figure 3:
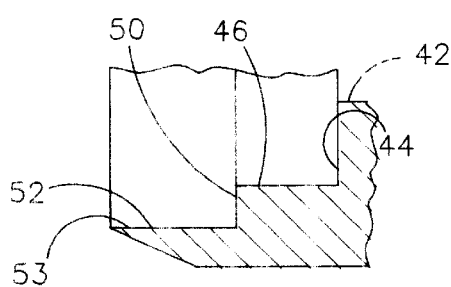
FIG. 3 is an enlarged view of the inner end of the housing.
Figure 4A:
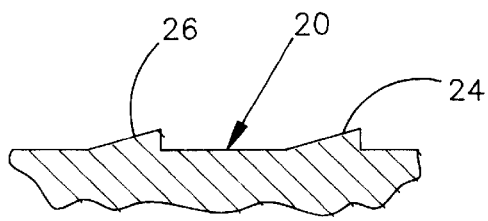
FIG. 4a is an enlarged view of the gripping barb ring on the exterior of the housing of the present invention.
Figure 4B:
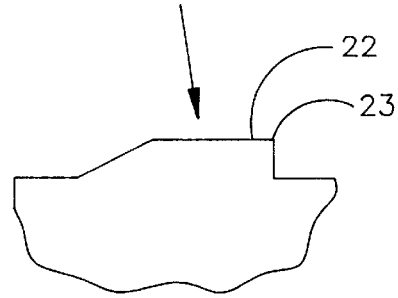
FIG. 4b is an enlarged view of another gripping barb ring disposed on the exterior of the housing of the present invention.

Turning now to FIG. 2, the housing 12 also includes a radially inwardly facing, axially extending interior surface 30 defining an interior passageway 41 therethrough. The radially inwardly facing interior surface 30 of the housing 12 includes a generally cylindrical reduced diameter portion 32 adjacent to its outer end. At its axially inner end, reduced diameter cylindrical portion 32 terminates in a frusto-conically shaped first ramping portion 34. First ramping portion 34, at its axially inner end, terminates in a smaller second ramping (taper) portion 36. Second ramping (taper) portion 36 terminates at its axially inner end in a second generally cylindrical enlarged diameter portion 38, which itself terminates at its axially inner end in an axially outwardly, and radially inwardly facing third ramping portion 40. Third ramping portion 40 terminates at its axially inner end in a generally cylindrical, axially extending spring retaining surface 42 (FIG. 2). Spring retaining surface 42 terminates in a radially extending, axially inwardly facing seal seat surface 44. Seal seat surface 44 also includes an axially extending, radially inwardly facing portion 46. A tube support seat area 48 includes both a radially extending, axially inwardly facing surface 50, and an axially extending, radially inwardly facing surface 52.

The various surfaces of the radially inwardly facing surface 30 of the housing 12 all have different functions. Reduced diameter, radially inwardly facing surface 32 acts as a containment or a guide for the grip/release mechanism 14, to keep grip/release mechanism 14 stable within coupling cartridge 10. Surface 32 keeps grip/release mechanism 14 from making any erratic motion that could cause air leaks. Surface 32 is sized to fit tightly adjacent and around an exterior surface 60 of grip/release mechanism 14 to help prevent moisture, dirt and debris from infiltrating coupling 10.

Ramping surface 34, serves to radially compress grip/release mechanism 14 to cause an interior surface 76 of grip/release mechanism 14 to bite into and seal the flexible hose (not shown) when an axially outwardly directed force is exerted on the hose. The tighter the pressure, or axially outwardly directed force that is exerted on the flexible hose, the tighter that grip/release mechanism 14 will compress to grab the hose, due to the radially compressive force exerted on grip/release mechanism 14 by ramping surface 34.

Surface 36 is a taper into a clearance area for providing a greater clearance in the area near surface 38. Ramped surface 36 and ramped surface 40 define the extent of surface 38 that provides extra clearance so that grip/release mechanism 14 has the capability of opening up through radial expansion to reduce the insertion forces (axially inwardly directed force) necessary to engage a hose with cartridge 10.

Surface 40 is a taper section used to reduce the diameter of interior passageway 41 from the diameter of surface 38 to a diameter (defined by surface 42) that will provide stability to better seat Teflon seal 18. Surface 42 leads into surfaces 44 and 46. Surfaces 44 and 46 serve as a seat for Teflon seal 18 and provide an area for seal 18 to be compressed against. When seal 18 is inserted, it creates a seal sufficient to retain the air under pressure.

Surface 44 is a surface on which a radially outwardly facing surface 42 of seal 18 win abut against cartridge housing 12. Surface 50 is a ledge that serves as a seat for tube support 16. Surface 50 creates a positive stop for tube support 16 to eliminate the ability of tube support 16 to move axially toward the outer end of the coupling 10, and thereby move the seal bead on tube support 16. Surface 52 is a concentric diameter surface to radially contain tube support 16 until its is assembled. An axially inner end 53, shown in FIG. 3, of surface 52 is rolled to form a radially inwardly extending lip, having an inner diameter smaller than the outer diameter of a base portion 91 of tube support 16, to retain tube support 16 within interior passageway 41 of housing 12.

Figure 5:
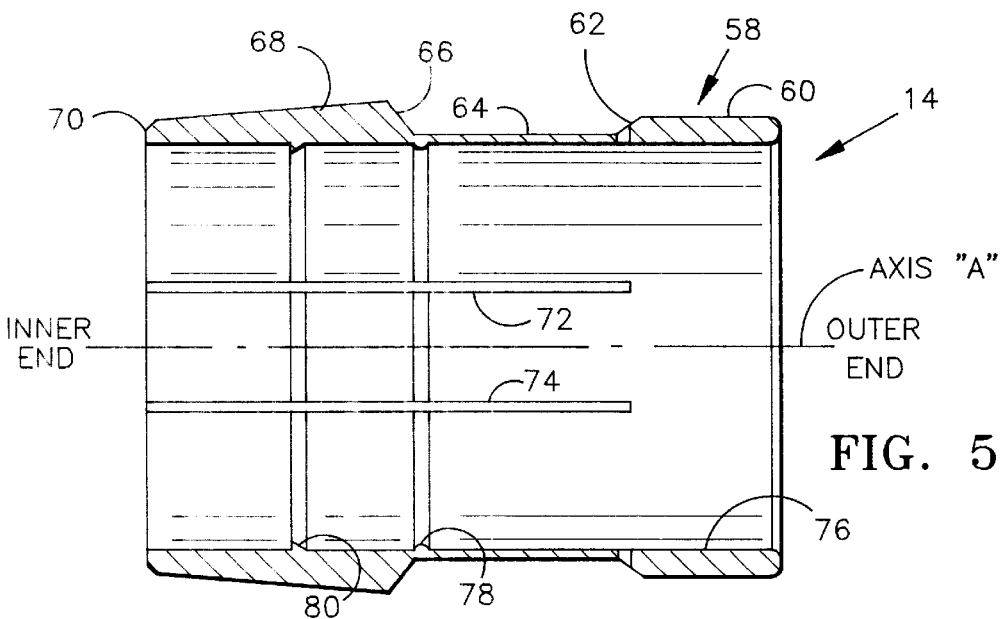
FIG. 5 is a longitudinal, sectional view of the grip/release mechanism of the present invention.
Figure 6:
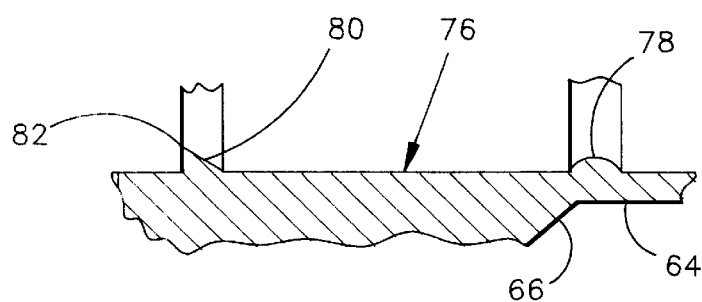
FIG. 6 is an enlarged view of the gripping ring disposed on the radially inwardly facing, axially extending wall of the grip/release mechanism of the present invention.

Grip/release mechanism 14 is best shown in FIGS. 1, 5 and 6 and includes an axially extending radially outwardly facing exterior surface 58. Exterior surface 58 has several segments including the generally cylindrical surface 60 disposed adjacent to the axially outer end of grip/release mechanism 14. A frusto-conical, generally axially inwardly and radially outwardly facing taper portion 62 is formed at the axially inner end of cylindrical portion 60. A second cylindrical portion 64, is disposed axially inwardly of taper 62. Given the shape of grip/release mechanism 14, cylindrical surface 64 can be said to comprise a "waist" portion of exterior surface 58. Waist surface 64 terminates at its axially inner end in a ramping surface 66 which generally faces radially and axially outwardly. Ramping surface 66 terminates, at its axially inner end, in a frusto-conical tapered surface 68.

Tapered surface 68 has it greatest diameter at its axially outer end, and its smallest diameter at its axially inner end. At the axially imier end of taper surface 68 is formed a chamfered end surface 70 that is also generally frusto-conical in shape, and faces axially inwardly and radially outwardly. End surface 70 has its greatest diameter at its axially outer end, and its smallest diameter at its axially inner end. Cylindrical ring-like grip/release mechanism 14 also includes an axially extending radially inwardly facing interior surface 76. Radially inwardly facing interior surface 76 is generally cylindrical and has a generally constant diameter throughout its length. However, this generally constant diameter is interrupted in two places, by a gripping ring 78 and a gripping ring 80.

Gripping ring 78 is a convexly arcuate gripping seal ring and gripping ring 80 is a barbed gripping ring (or gripping barb). Griping barb ring 80 is barbed shaped, generally triangular in cross section, and extends circumferentially around the entire interior surface 76. The point 82 (FIG. 6) of barb ring 80 points relatively axially inwardly to resist axially outward movement of the hose (not shown) by gripping the hose with barb point 82. Convexly arcuate gripping ring 78 has a generally convex arcuate-in-cross-section surface and also extends circumferentially around the entire radially inwardly facing interior surface 76 of grip/release mechanism 14.

A plurality (usually 6 or 8) axially extending slots, e.g. 72, 74, are formed to extend axially through grip/release mechanism 14 from the inner end of grip/release 14 to a blind depth thereby permitting grip/release mechanism 14 to compress radially inward. Preferably, grip/release mechanism 14 is formed of a material that has a memory, so that any radially inward compression on grip/release mechanism 14 will ultimately, after the radially inward compressive forces are no longer being exerted, result in a radially outward movement of grip/release mechanism 14 to permit it to re-resume its rest position wherein some separation exists between the adjacent edges of the slots and radially inwardly facing interior surface 76.

The generally cylindrical surfaces of grip/release mechanism 14 serve the following functions. Surface 60 is disposed in an axially-similar, opposed relation to surface 32 (FIG. 2) of housing 12. The snug fit between surfaces 32 and 60 provides stability for grip/release mechanism 14. Waist portion surface 64 provides a diameter reduction referred to as a waist section, to provide more flexibility in grip/release mechanism 14, thereby making it easier to expand grip/release mechanism 14 as grip/release mechanism 14 is moved axially inward to release the hose (not shown) from its connection with coupling cartridge 10. Waist portion 64 further makes it easier to radially compress grip/release mechanism 14 as grip/release mechanism 14 is moved axially outward. The ability to disconnect the hose from coupling cartridge 10 facilitates the servicing of the air system such as by replacing a hose when the hose wears out, or develops a leak.

Surface 66 is tapered to expand the outer diameter of grip/release mechanism 14 to permit tapered surface 68 to better retain grip/release mechanism 14 within housing 12. The largest diameter of tapered surface 68 is smaller than the diameter of surface 38 of housing 12 but larger than the diameter of surface 32 of housing 12, such that grip/release mechanism 14 must be radially compressed during assembly with housing 12. Tapered surface 68 rides on taper 34 of housing 12 interior surface 30, exerting a radially inwardly directed compressive force on grip/release mechanism 14 to radially compress grip/release mechanism 14 and thereby help retain the hose on coupling 10, and create a seal on tube support member 16.

Tapered surface 68 is tapered to provide clearance for grip/release mechanism 14 when grip/release mechanism 14 is moved axially inwardly (depressed) into the release position for extracting the flexible hose from coupling cartridge 10. Grip/release mechanism 14 interacts with tube support member 16 to facilitate a radial expansion of grip/release mechanism 14 when grip/release mechanism 14 is depressed into the release position. Chamfered surface 70 exists both for cosmetic purposes and to prevent operators from cutting their hands when handling grip/release mechanism 14. Slots 72 and 74 provide the springiness and flexibility of grip/release mechanism 14 that are necessary in order to radially compress or radially expand grip/release mechanism 14, depending on whether the hose is being inserted into position on coupling 10, or being detached from coupling cartridge.

Surface 76 is a containment surface to help contain the hose at its intended diameter, and to keep the hose from ballooning radially outwardly under any form of pressure.

Surface 76 also helps to guide the flexible hose over sealing bead ring 78 and barbed grip ring 80 and provide blow out protection by containing the hose in a given area around tube support 16. The use of bead ring 78 is preferred over a barbed ring (such as barbed ring 80) because it is believed that the pointy surface (e.g. 82, FIG. 6) on a barbed ring (e.g. 80) would bite into a hose being held on tube support 16, thereby increasing the likelihood that the hose will get sliced under pressure.

The arcuately convex shape of the bead ring 78 has no sharp edge, and is therefore much less likely to cut into the hose or to create a relief path for the hose to expand and allow air pressure to escape from coupling 10. Bead ring 78 also ensures that the hose does not become detached from coupling 10. Notwithstanding the foregoing, the grip ring 80 should have a sharp barbed point 82 to grip the hose and hold it within cartridge 10 under any form of axially outwardly directed load, to thereby hold the hose in place on cartridge 10 and retain the hose within cartridge 10 during active service.

Tube support 16 is best shown in FIGS. 1, 8, 9 and 10, and includes a generally cylindrical axially extending portion 89 that is generally tube-like in configuration. Tube support 16 also includes base portion 91 that is disposed at the axially inner end of tube portion 89. Tube portion 89 includes a generally cylindrical, axially extending, radially outwardly facing surface 90 that is generally smooth and has a constant diameter throughout its length. This smoothness is interrupted only by the presence of a radially outwardly extending, generally convex, arcuate, grip ring 94 that extends circumferentially around tube portion 89. Grip ring 94 is shown in detail in FIG. 10, and generally has an arcuately convex surface, the radius of said surface being preferably 0.032 inch. The upper most point of the ring extends approximately 0.007 inches above the predominant surface 90.

Adjacent to the axially inner terminus of tube portion 89 is disposed a radially extending, axially outwardly facing ledge 96, that comprises the beginning of base portion 91. Ledge 96 terminates in grip/release mechanism release taper 98, that extends generally at an angle to the longitudinal axis A of coupling 10, and generally faces radially and axially outwardly. Grip/release mechanism release taper 98 terminates in an axially outwardly facing, radially outwardly extending second ledge 100. Second ledge 100 terminates in a generally axially extending, radially outwardly facing cylindrical-shaped seal containment surface 101. Seal containment surface 101 extends generally parallel to the longitudinal axis A, and terminates at its axially inner end in an axially outwardly facing, radially extending third ledge, that comprises seating surface 102. Seating surface 102 terminates at its radially outward end in an axially extending end surface 104. End surface 104 mates with the axially inwardly facing, radially extending base surface 120 of tube support 16.

The interior surface 110 of tube portion 89 is generally smoothly cylindrical, has a constant diameter, and faces radially inwardly, to define a hollow passageway 115 extending longitudinally (axially) through tube portion 89 and base portion 91. Tube portion 89 terminates at its axially inner end in a radially extending, axially inwardly facing shelf surface 112, that terminates at its radially outward end in a radially and axially inwardly facing taper surface 114, that terminates at its axially inner end in a radially outwardly extending, axially inwardly facing ledge surface 116. At the radially outward end of ledge surface 116, a right angle is formed, to terminate into an axially extending, radially inwardly facing surface 118, which itself terminates in, and mates with base surface 120.

As tube support member 16 is machined from a generally sheet-like material, the interior surface 110 of the tube portion 89 corresponds generally in size and position with axially outwardly facing, exterior surface 90 of tube portion 89. Similarly, interior surfaces 112, 114, 116, and 118, correspond generally in size and position with their corresponding exterior surfaces 96, 98, 100, and 101, respectively.

As a whole, tube support 16, supports the hose from the inside of the flexible air hose, preventing the hose from collapsing when the hose is gripped by grip/release mechanism 14. Chamfered end 92, and radially outwardly facing surface 90 are starting points for the hose to slip over and guide itself as it is pushed axially inwardly along tube portion 89 of tube support 16. As the hose is pushed over gripping ring 94, the inner diameter of the hose increases to enable the hose to ride over gripping ring 94. The elasticity of the hose enables it to force a seal between griping ring 94, hose, and tube support 16. The diameter of the hose contracts back as it moves axially inwardly of griping ring 94 and becomes flush against surface 90 again until the end of the hose abuts ledge surface 96. Ledge surface 96 is a stop point for the insertion depth of the hose.

Taper 98 functions as a release mechanism in conjunction with grip/release mechanism 14 as grip/release mechanism 14 is depressed by being moved axially inwardly. The slotted axially inward end of grip/release mechanism 14 will expand radially outwardly to release the grip of barbed ring 80 from the hose, enabling the hose to be extracted from the assembly. The radial expansion of grip/release mechanism 14 is caused by the slotted axially inward end of grip/release mechanism 14, and in particular surface 76, traveling up the incline of taper 98 of tube support 16.

Surface 100 is a ledge extending from taper 98 to seal containment surface 101. Seal surface 101 prevents Teflon seal 18 from being over compressed and expanding or contracting into the inside surfaces of cartridge 10 as a whole. Surface 102 serves two functions. First, it serves to compress an axially inner end 146 of seal ring 18, thereby creating an air-tight seal with Teflon seal ring 18. Seal 18 also seats on ledge 50 (FIG. 2) in housing 12 that prevents tube support 16 from being compressed excessively by moving sealing ring 94 (FIG. 8) of tube support 16 to much towards the axially outward end of the assembly. This makes it impossible for sealing ring 78 of grip/release mechanism 14 to close the gap between sealing ring 94 of tube support 16 and sealing ring 78 of grip/release mechanism 14 to significantly less than the thickness of the hose. When the gap between sealing ring 78 and sealing ring 94 is less than the tube thickness, an air-tight seal is achieved. Surface 104 indicates the outer-most diameter of tube support 16. Surface 120 indicates the base of tube support 16 which is where housing 12 is coined over to form a lip, to hold the entire assembly together as an individual unit. Primarily for manufacturing purposes, surfaces 112, 114, 116, 118 are mirror-images of working surfaces 96, 98, 100, and 101. These surfaces exist to expedite the manufacturing by enabling tube support 16 to be manufactured by a stamping operation, rather than as a machining operation.

Figure 7:
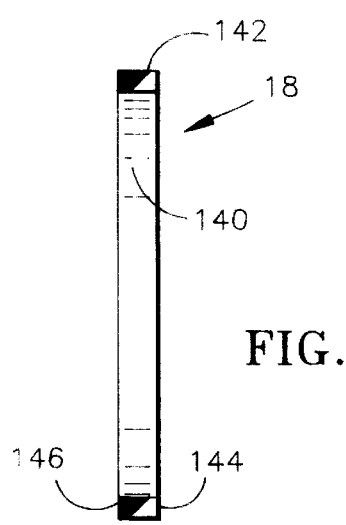
FIG. 7 is a longitudinal, sectional view of the Teflon ring of the present invention.
Figure 9:
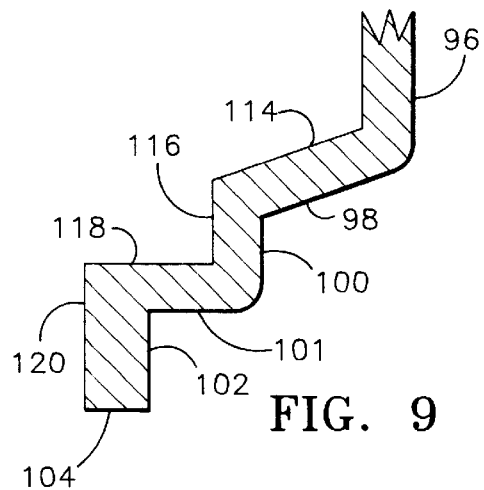
FIG. 9 is an enlarged version of the base portion of the tube support of the present invention.
Figure 8:
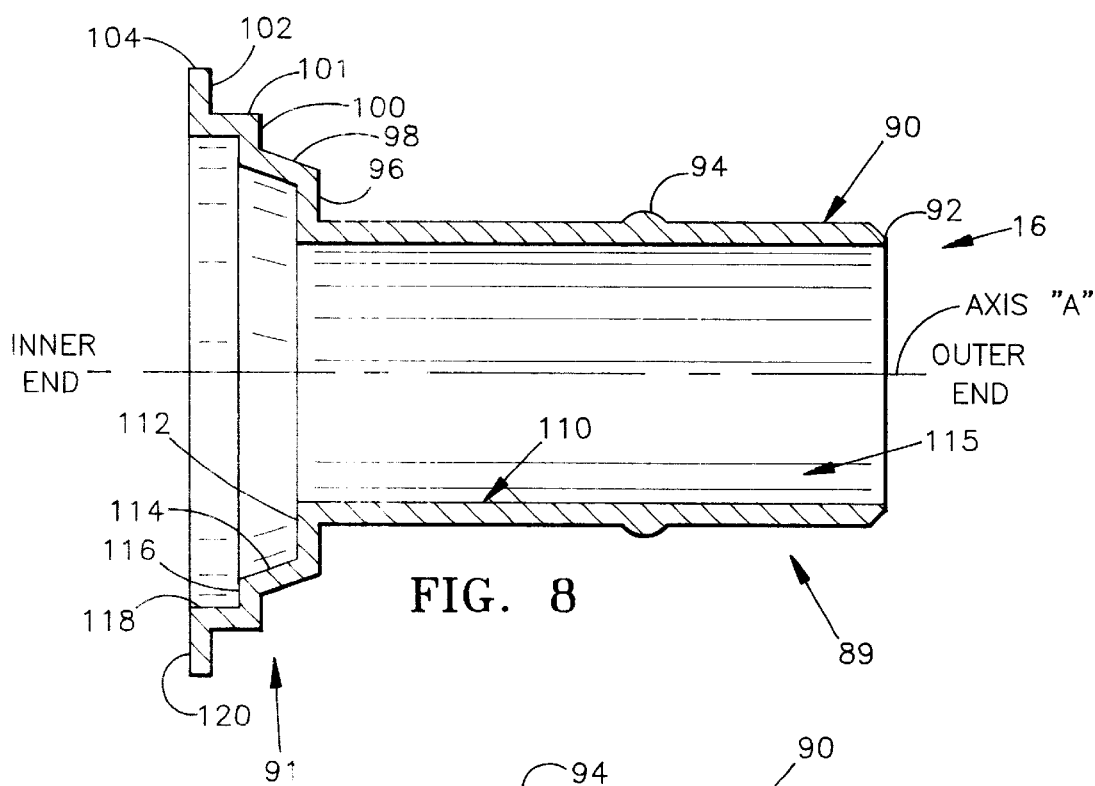
FIG. 8 is a longitudinal, sectional view of the tube support of the present invention.
Figure 10:
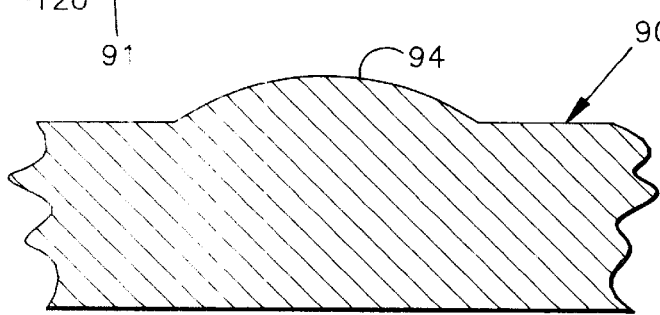
FIG. 10 is an enlarged view of a gripping means disposed on the radially outwardly facing, axially extending wall of the tube support of the present invention.

The final major component of coupling 10 is Teflon ring 18 (FIG. 7). Teflon ring 18 is generally cylindrically, washer-shaped in configuration, and has a rectangular cross section. Teflon ring 18 includes a cylindrical interior surface 140, a radially facing exterior surface 142, an axially outwardly facing, generally planar upper surface 144, and an axially inwardly facing, generally planar lower surface 146. Returning to FIG. 1, it will be noticed that when Teflon seal ring 18 is positioned within cartridge 10, the axially outwardly facing surface 144 of Teflon seal ring 18 seats against surface 44 of cartridge housing 12 (FIG. 2). Radially outwardly facing exterior surface 142 seats against surface 46 of cartridge housing 12. Radially inwardly facing surface 140 is provided for seating against the radially outwardly facing surface 101 of tube support 16. Since, in this embodiment, the position of tube support 16 with respect to housing 12 is fixed (due to the coining over of housing 12), surface 101 of tube support 16 will not tend to move against surface 140 of Teflon seal ring 18. Rather the two will be generally statically positioned with respect to each other to not move with respect to each other.

Finally, the axially inwardly facing surface 146 of Teflon seal ring 18 is designed to seat against the axially outwardly facing, radially extending surface 102 of tube support 16. As such, it will be appreciated that on all four sides 140, 142, 144, 146 of Teflon seal ring 18, there is a corresponding surface of either tube support 16, or cartridge housing 12, which helps to prevent leaks from escaping around Teflon seal ring 18. Additionally, Teflon seal ring 18 does not contact the hose when the hose is assembled to coupling 10.

One advantage of the present invention is that it is designed to better capture and maintain the position of Teflon seal ring 18, preventing it from becoming crushed or deformed, as such crushing or deformation would promote air leakage. Another advantage of the present invention is the use of an arcuate-surfaced gripping ring 78 on interior surface 76 of grip/release mechanism 14. Applicant has found that the use of such a sealing ring 78 with an arcuately convex surface helps to facilitate insertion of the hose, providing a good, air-tight seal between the hose and grip/release mechanism 14 and tube support 16.

It should also be noted that the distance that grip rings 78 (or grip release mechanism 14), 94 (or tube support 16) are longitudinally offset decreases as the grip/release mechanism 14 moves axially outwardly, and increases as grip/release mechanism 14 is depressed, to move axially inwardly. This feature aids in the insertion of the hose onto cartridge 10, the retention of the hose on cartridge 10, and the removal of the hose from cartridge 10.

When the hose is being inserted onto cartridge 10, grip/release mechanism 14 is moved axially inwardly to increase the longitudinal offset of sealing rings 78, 94, thereby making it easier to pass the hose over and around sealing rings 78, 94. When an axially outwardly directed force is exerted against the hose to disengage it from cartridge 10, grip/release mechanism 14 is also pulled axially outwardly, which: (1) reduces the longitudinal offset between sealing rings 78, 94; and (2) causes grip/release mechanism 14 to be compressed radially inwardly through the interaction of ramping surface 66 (FIG. 6) with ramping surface 34 (FIG. 2) of the housing 12. The compression of grip/release mechanism 14 causes barbed gripping ring 80 to engage the exterior of the hose. As such, the barbed gripping ring 80 on the grip/release mechanism 14, and the combination of sealing rings 78, 94, retain the hose to prevent its disengagement when an axially outwardly directed force is exerted.

Upon intentional release of the hose, grip/release mechanism 14 is depressed axially inwardly to increase the longitudinal offset between sealing rings 78, 94, thus facilitating the removal of the hose from the space between surface 76 of grip/release mechanism 14 and radially outwardly facing exterior surface 90 of tube support 16. The axially inward movement of grip/release mechanism 14 radially expands grip/release mechanism 14 through the interaction of grip/release mechanism 14 and the base portion 91 of the tube support member 16, thereby ensuring that barbed gripping ring 80 is not engaging the hose.

Figure 11:
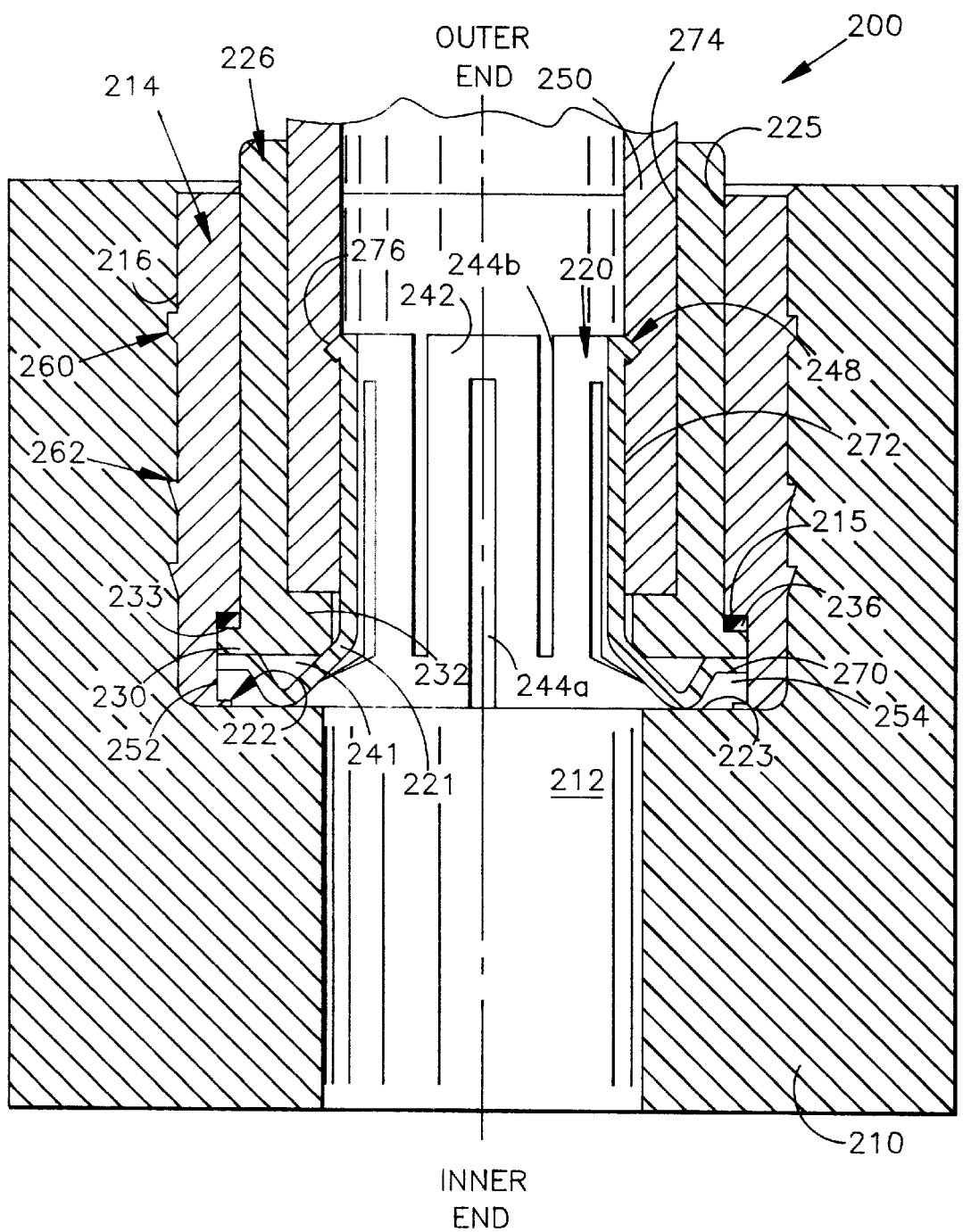
FIG. 11 is a sectional view of a second embodiment of a coupling in the enlarged position.

A second embodiment 200 is shown in FIG. 11. The second embodiment 200 is a dual tube system which includes an inner tube used to grip the inside of the nylon air tube and an outer tube which fits along the exterior of the flexible air tube. The second embodiment 200 differs from other hose couplings because the gripping mechanism grips the inside of the nylon air tube instead of the outside of the nylon air tube. Traditionally, the hose was gripped on its outer surface and a tube support was used to prevent the hose from collapsing due to the outer grip mechanism and falling off of the fitting.

Turning now to FIG. 11, a manifold 210 is shown, into which the coupling 200 is fitted. The manifold 210 is part of the truck. The manifold is typically made of some sort of metal such as aluminum, with plastic injection moldings coming out of it. The manifold 210 includes a manifold air passageway 212. The second embodiment includes a housing 214, a release mechanism 226, a seal 236, and a tube support 220.

The actual outer housing 214 of the coupling 200 is generally cylindrical and includes an axially-extending outer cylindrical surface 216. A free floating air space exists between the bottom of the generally hollow housing 214 and manifold 210. The housing 214 includes an interior passageway 241 into which the other components of the coupling 200 are mounted. One of the components, the tube support 220, includes a spring portion 221 which presses against the axially outwardly facing, radially extending surface 223 of manifold 210. The axially inner portion of housing 214 contains a radially inwardly rolled retaining lip 222 for retaining the spring portion 221 in the interior passageway 241 of the housing 214. The lip 222 is rolled so that it is slightly smaller than the outside diameter of the spring portion 221 of tube support 220. The radially-extending lip 222 extends radially inwardly from the axially-extending wall 216 of housing 214. A second component, a generally cylindrical release mechanism 226, is disposed radially interiorly of the radially facing, axially extending surface 225 of the housing. Preferably the housing 214 is made from brass or aluminum Although aluminum is lighter and cheaper than brass, brass is the preferred material from which to make the housing due to its durability and resistance to corrosion. In a corrosive environment, aluminum is more likely to pit than brass.

The outside of the cartridge housing 214 includes a first (upper) set of barbs 260 and a second (lower) set of barbs 262. The barbs help to maintain the cartridge 214 within the manifold 210. Alternately, the barbs 260, 262 can be replaced by an alternate gripping means such as screw threads, depending on the device. This adaptability helps to make the device adaptable to other settings where screw threads or a bayonet mount, rather than the barbs, would be appropriate. For example, if the housing 214 needs to be threaded into a threaded pipe or port, then a slight design change will enable the cartridge and hence fitting to meet the product requirements.

The release mechanism 226 is a cylindrical ring made preferably of brass. At the axially inner end of the release mechanism, a radially outwardly extending lip or ledge 230 is formed, along with a radially inwardly extending shelf 232. The radially outwardly extending lip 230 provides an axially outwardly facing ledge 233 which forms a seat for a Teflon-based polymer ring 236 between a radially extending portion of the inner surface 225 of housing 214 and the ledge 233 of release mechanism 226. The Teflon-based polymer seal 236 creates a seal between housing 214 and release mechanism 226.

Tube support 220 also includes an axially extending tube support portion 242 having a plurality of axially extending slots 244a, 244b formed therein. Slots 244a extend almost the full length of tube support 220 and open to the axially inner end of tube support 220. Slots 244b extend almost the full length of tube support 220 and open to the axially outer end of tube support 220.

Figure 12:
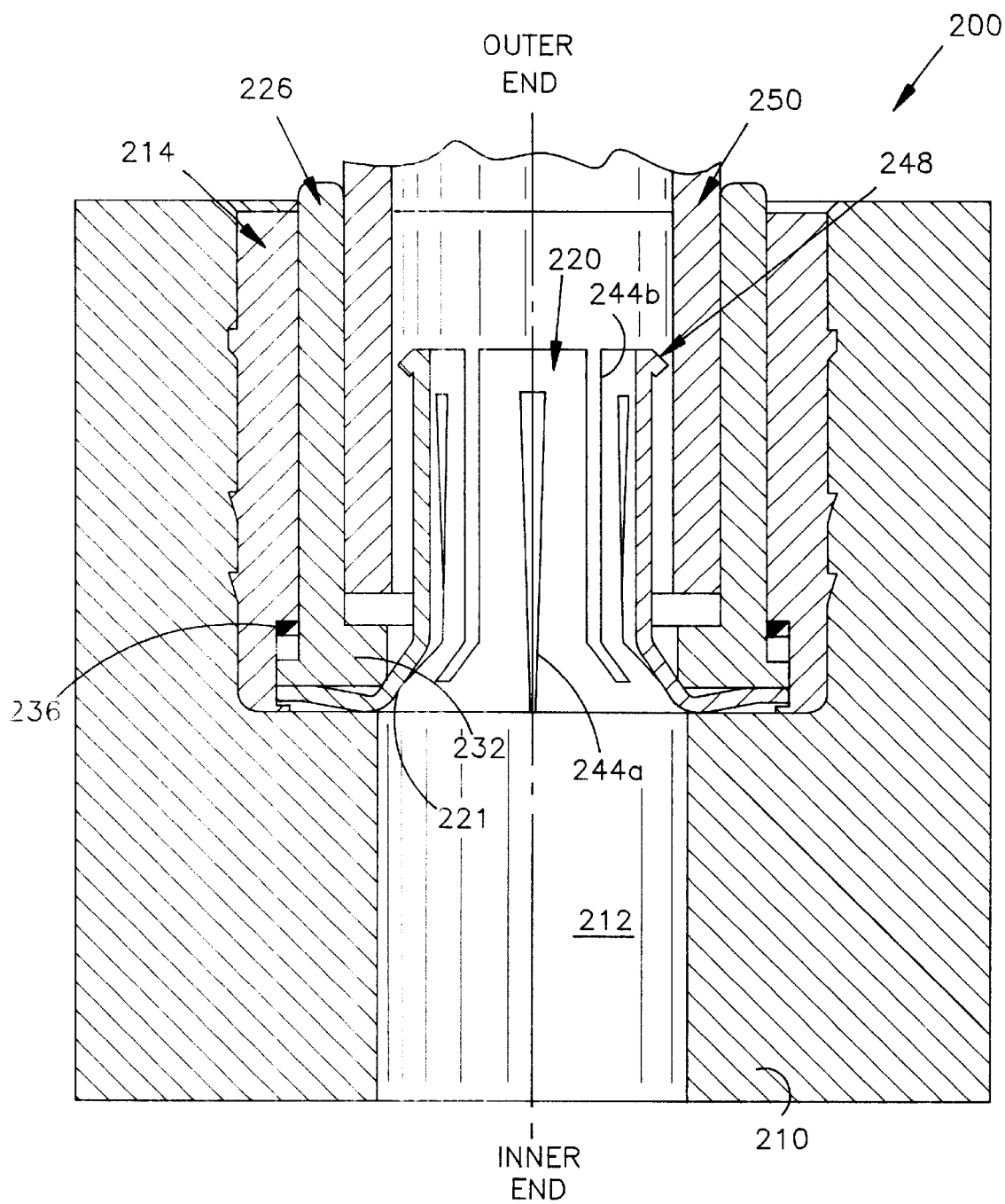
FIG. 12 is a sectional view of a second embodiment of a coupling in the compressed position.

Slots 224a, 244b allow the cylindrical portion 242 of tube support 220 to collapse inwardly so that the radial diameter of tube portion 242 can change between its compressed position (FIG. 12) and its expanded position (FIG. 11). Near the outer end of tube portion 242 is a radially outwardly extending barbed grip member 248 that extends radially outwardly and circumferentially to grip and engage the inner surface of the rubber (nylon) air tube member 250. Grip member 248 engages air hose 250 when tube support portion 242 is in the expanded position (FIG. 11) and therefore prevents the axial movement of air hose 250. Grip member 248 disengages air hose 250 when tube support portion 242 is in the compressed position (FIG. 12), thereby permitting air hose 250 to move axially.

Spring portion 221, which is disposed at the bottom of tube support 220, extends radially outwardly underneath release mechanism 226. Release mechanism 226 terminates at its radially outermost portion against a radially inwardly facing wall 252 of housing 214. Spring portion 221 of tube support 220 provides resistance to prevent the radial collapsing of tube support portion 242 and gripping barb 248 of tube support 220. Spring portion 221 also facilitates the compression of tube support portion 242 when release mechanism 226 is depressed to move axially inwardly. The spring portion enables tube support portion 242 to collapse when release mechanism 226 is moved axially inwardly and to return back to its expanded position and engage hose 250 when release mechanism 226 is moved axially outwardly.

When tube support portion 242 is in the expanded position, it prevents hose 250 from becoming disengaged from coupling 200. Spring portion 221 biases release mechanism 226 axially outwardly, such that ledge 233 is in contact with seal 236. The pressing of spring portion 221 of tube support 220 against manifold 210 should have no effect on the spring portion due to the design and the available space between the base of the housing (rolled lip 222) and release mechanism 226 when tube support 220 is in its fully expanded position.

To assemble the other components of coupling 200 to cartridge housing 214, each component is loaded from the axially inward end of housing 214. Rolled lip 222 on housing 214 is not yet formed when the components are being inserted into housing 214. Teflon seal 236 is loaded first such that it seats in its proper ledge 215 on housing 214. The use of seal 236 makes coupling 200 more leakproof and reduces the manufacturing costs of the coupling 200 by obviating the need for using and maintaining tight machining tolerances for the radially inwardly facing surface 225 of housing 214 and the radially outwardly facing surface of release mechanism 226. Release mechanism 226 is then inserted and is moved axially outwardly until ledge surface 233 contacts Teflon polymer ring 236. The tube portion 242 of tube support 220 is then compressed radially inwardly, and the axially extending portion 242 is inserted into housing 214 until all the components are engaged as shown in FIG. 11. Lip 222 is then rolled or formed onto the bottom of housing 214 to maintain tube support 220 and release mechanism 226 within the housing and to maintain all the parts together. Once in that position, because there is an air space (clearance area 254) between the radially outwardly extending leg 270 of tube support 220 and rolled lip 222 of housing 214, spring portion 221 can move axially over clearance distance 254. Tube support 220 can float back and forth within that clearance 254 until coupling 200 has been inserted within the cavity formed in manifold 210.

Next, air tube 250 is pushed into the space between the radially outwardly facing surface 272 of tube support 220 and the radially inwardly facing surface 274 of release mechanism 226. Air tube 250 is inserted from the axially outer end of housing 214. As air tube 250 is pushed axially inwardly, the end of air tube 250 contacts barb 248. Barb 248 has a slanted or angled axially outwardly facing ramping surface 276, so that air tube 250 can radially compress the axially extending tube portion 242 of the tube support. The compression is allowed by slots 244a, 244b. As shown in FIG. 11, barbed edge 248 faces axially inwardly so that when air tube 250 is pulled axially outwardly, barb 248 engages the inner surface of air tube 250 and thereby prevents air tube 250 from moving axially outwardly and becoming disconnected from coupling 200.

Figure 13:
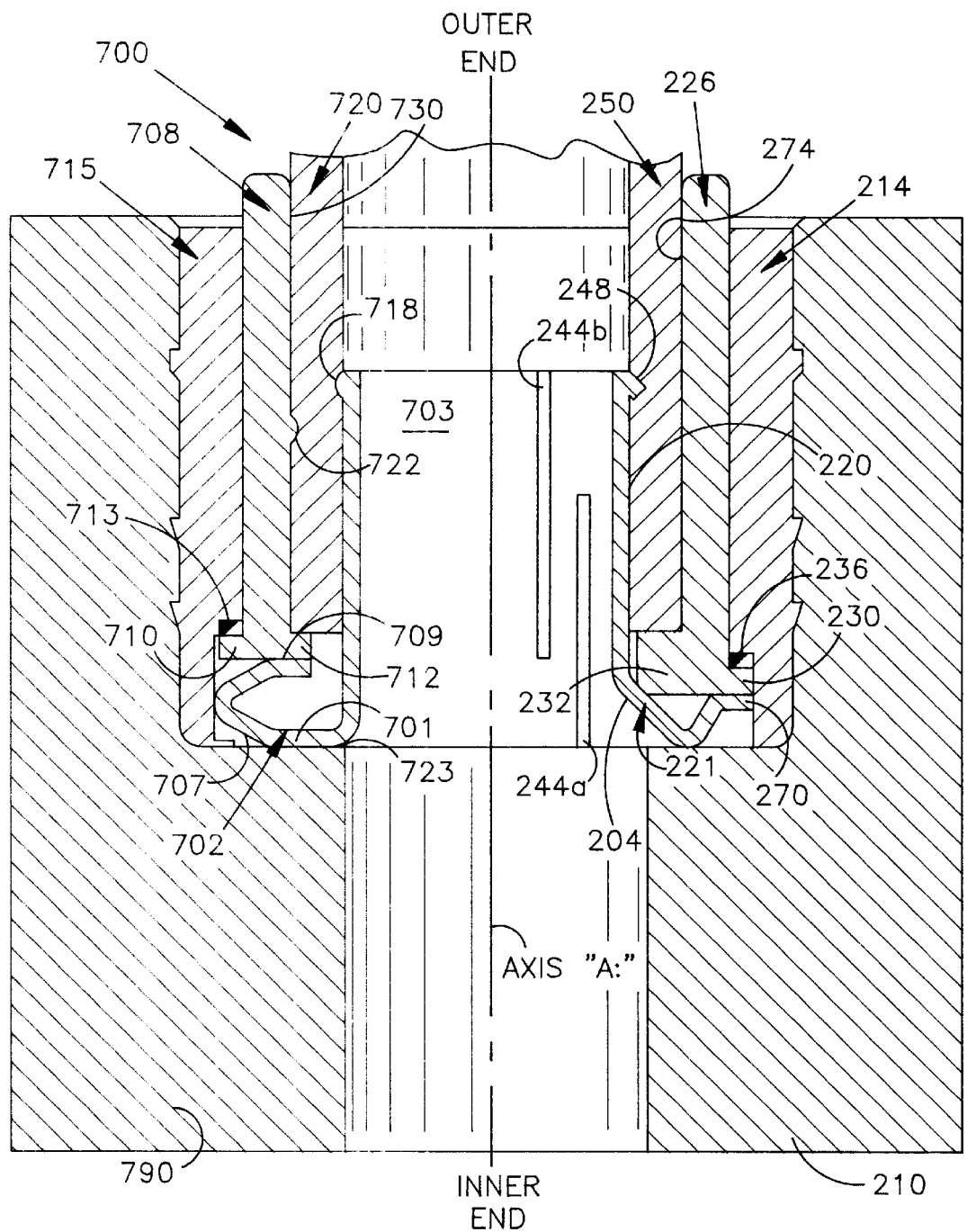
FIG. 13 is a divided sectional view of the second and third embodiments of a coupling.

A third embodiment is shown on the left side of FIG. 13. FIG. 13 is a split drawing where the coupling shown to the right of axis A is coupling 200 of FIG. 11, and the coupling shown to the left of axis A is coupling 700 of the third embodiment of the present invention. Each embodiment has the same components with some configuration differences.

Several differences exist between coupling 200 and coupling 700. One difference is that tube support 703 is not slotted, whereas tube support 220 contains slots 244a, 244b. Spring portions 702 and 221 also have a different configuration. The third embodiment spring base 702:

(1) extends axially inwardly to about the axially outwardly facing surface 723 of manifold 790;
(2) then bends, at almost a right angle to extend radially outwardly;
(3) then bends about 30 degrees upwardly to form a ramping surface 707;
(4) then bends back at about 150 degrees; and
(5) then bends about 30 degrees to extend radially inwardly, perpendicular to longitudinal axis A. At this point it forms mating surface 709, for mating against a radially extending, axially inwardly facing ledge of release member 708, at the axially inward most end of release member 708. A tube support spring end 702 having this configuration enables tube support 703 to better serve as both a gripping and release mechanism (when compared to tube support 220). Also, tube support spring end 702 provides a greater degree of support then was achievable with the spring design 221 of tube support 220. In particular, angled leg portion 204 of spring end 221 on coupling 200 tends to reduce the gripping strength of the tube support 220 of coupling 200 when compared to spring portion 702 of tube support 703.

Further, tube support 703 is much stiffer than tube support 220 by not having slots. Therefore, tube support 703 is more solid than tube support 220 and much less likely to collapse at the axially outer end where gripping ring 718 is located. Additionally, leg portion 701 is much stiffer than leg portion 204, thereby creating a much stiffer spring and enabling grip release mechanism 708 to stay in the closed position retaining the air tube 720 more effectively than spring portion 221.

Grip and release mechanism 708 is disposed concentrically with, and radially inwardly of the housing 715. This combination grip and release mechanism 708 includes, at its axially inward end, a radially outwardly extending ledge 710 and a radially inwardly extending ledge 712. The ledges 710, 712 have a thinner axial dimension than their counterpart ledges 230, 232. The purpose of ledge 710 is to retain the grip release mechanism 708 within the cartridge housing 715. Ledge 710 also butts against Teflon seal ring 713. Ledge 712 serves as a stop position for the axially inner end of the air tube 720. Ledge 212 on coupling 200 was thicker so that it would engage spring 221 at area 204.

Another significant difference between coupling 200 and coupling 700 is that coupling 200 uses a barbed member 248 that, in cross section resembles a barb on a fishing hook, whereas coupling 700 uses a rounded, arcuate surface containing, convex, circumferential ring member 718. The rounded member 718 does not generally have the gripping force of barb member 248, but it does have better sealing properties than barb member 248.

A further difference between coupling 200 and coupling 300 is that the radially inwardly facing axially extending surface 274 of release member 226 of coupling 200 is smoothly cylindrical. However, the corresponding radially inwardly facing surface 730 of grip/release member 708 of coupling 700 has a ring shaped, arcuately convex surface containing grip ring 722 which extends radially inwardly from the radially inwardly facing, axially extending wall of grip/release member 708.

Grip ring 722 is semi-circular in cross-section, and, as such provides weaker gripping but better sealing properties than a corresponding barb shaped gripping ring, e.g. 248. The combination of grip ring 718 and 722 both seal around air tube 720 and grip air hose 720. This combination provides a more secure grip than the single barb 248 of coupling 200. The combination further provides a better sealing than barb 248 because of the semi-circular cross-section of gripping rings 718, 722 as opposed to the barb cross-section of barb 248 which can pinch and create an air gap.

When an air tube 720 is being inserted between tube support 703 and grip release 708, tube 720 is pushed axially inwardly. Air tube 720 cannot move grip ring 718 axially or radially inward because tube support 703 is a solid member. However, it can move grip ring 722 axially downwardly against the force of spring 702 so that rings 722 and 718 are not longitudinally aligned, but rather are longitudinally (axially) offset. This permits air tube 720 to snake down past grip ring 718, and then around grip ring 722, to reach the insertion point where the end of the air tube 720 abuts against the axially outwardly facing surface of ledge 712. Air tube 720 is secured in coupling 700 because an axially outward force pulls air tube 720 which pulls grip ring 722 axially outwardly to a point where grip ring 722 is in axial alignment with gripping ring 718. When in a closely axially aligned position, the radial extent of the aligned grip rings 718, 722 radially squeezes the tube too tightly to permit it to be extracted. As such, extraction can occur (in the absence of extraordinary force), only if the grip release member 708 is pushed axially inwardly to place the gripping rings 718, 722 in a longitudinally offset position (as shown in FIG. 13), and an axially outwardly directed force is simultaneously exerted on air tube 720 to pull it out of engagement with coupling 700.

A fourth embodiment coupling 300 is shown in FIGS. 14–17. Coupling 300 includes a housing 301, a grip/release mechanism 310, a sealing ring 304, and a tube support 315.

Housing 301 has an axially extending portion which terminates at its axially inner end in a rolled lip 302 at the bottom of the housing 301. The housing 301 has a significantly different configuration than the housing 715 of coupling 700. In particular, the axially inward end of the housing 301 has a different configuration. Housing 301 has a radially widened configuration that permits the incorporation of a mechanical release mechanism on a bottom portion of the grip release mechanism (ring) 310. Housing 301 also contains a taper to function as a ramp 306. Ramp 306 is a taper designed to engage the corresponding ramping surface 308 on grip release member 310. Ramping surface 308 of the grip/release mechanism 310 mates with ramping surface 306 of the housing so that if the grip/release member 310 is moved axially outwardly, the interaction between these two ramping surfaces 306, 308 causes the grip/release member 310 to move radially inwardly to grip the air tube. Ramp 308 rides on ramp 306 to constrict grip rings 332, 330 on grip release mechanism 310. This constriction causes grip rings 330, 332 to bite into the air hose, thereby preventing the hose from being accidentally pulled entirely out of coupling 300.

The grip/release member 310 is preferably a semi-slotted piece of brass. Grip/release member 310 contains slots 314 (FIG. 15) that begin at the axially inward end 315. The slots 314 extend axially outwardly up to the small diameter portion 317 of the grip/release mechanism 310. Slots 314 enable the grip/release mechanism 310 to compress both radially inwardly and expand radially outwardly, depending on which way force is applied to the grip/release mechanism 310. The grip/release mechanism 310 also includes a second angled surface 320, that is disposed axially outwardly of angled surface 308, to create a radially inwardly, reduced diameter recessed portion 317 there between. The recessed portion 317 increases the flexibility of the grip/release mechanism 310, and helps to prevent air leakage, water infiltration, or debris infiltration between the housing 301 and the grip/release mechanism 310.

In the area of grip/release mechanism 310 denoted as 322, it is desirable to have a close fit between the grip/release mechanism 310 and the radially inwardly facing surface of the housing to prevent air leaks out, debris leaks in, and the like. Typically, the applicant has found that the clearance between the grip/release mechanism 310 and the housing 301 should be anywhere between 0.001 and 0.003 inches maximum clearance. Grip/release mechanism 310 is a floating member that can move axially within the cartridge.

The grip/release mechanism 310 contains a first 330 and a second 332 barbed ring formed on the radially inwardly facing surface of the grip/release mechanism 310. The primary purpose of the first barb ring 330 is to retain the flexible hose (not shown). The second barb ring 332 is considerably smaller and is positioned in an axially outwardly spaced relation to the first barb ring 330. The second barb ring 332 serves the purpose of pushing the air (hose) radially inwardly against the gripping ring 334 formed on the axially extending, radially facing surface 335 of the tube support 337, to help prevent air leakage.

Also, the position of second barb 332 when the release mechanism 310 is in its axially outward most position, pushes the flexible hose radially outwardly against the outwardly facing grip ring 334 of the tube support 315.

Tube support 315 is a solid member having a radially outwardly facing surface 335 on which is formed the arcuate, convex surface grip ring 334. In the embodiment of FIGS. 14–17, when the is pushed axially inwardly, the air tube causes grip/release mechanism 310 to move axially inwardly to allow the hose to slip over the grip ring 334, past second barb ring 332, and past first barb ring 330 until it reaches a point where the end of the hose abuts axially outwardly facing surface 346 of the tube support 337. In the process of passing the first and second barb rings 332 and 330, any resistance that is met by the air hose against the grip/release mechanism 310 will push the grip/release mechanism 310 axially inwardly against the axially inward portion of the tube support 337. The tube support 337 contains a ramp 341 that actually spreads the base 343 of the grip/release mechanism 310, thereby opening up the inside diameter of the first and second barb rings 330, 332 making it easier for the flexible air hose to pass through.

Accidental removal of the flexible hose is prevented due to the following reasons. First, the flexible hose will be physically caught on the barb rings 330, 332 to some extent, and secondly, the flexible hose will pull grip/release mechanism 310 axially outwardly because the grip/release mechanism 310 is axially movable. Axially outward movement of the flexible hose will pull grip/release mechanism 310 axially outwardly so that the second barb 322 moves or is placed in opposition to the radially outwardly facing grip ring 334. The second barb ring 332 presses the air tube radially inwardly firmly against ring 334. Also, the grip/release mechanism 310 runs into the taper 306 on housing 301 which compresses grip/release mechanism 310 radially inwardly, thereby imbedding the first barb ring 330 more firmly into the flexible air hose.

As a result, the entire axially extending, radially inwardly facing surface 349 of grip/release mechanism 310 exerts a radially inwardly directed gripping force against the 20 flexible hose, as a result of the radially inward pressure caused by the interaction of ramping surfaces 306, 308, as grip/release mechanism 310 moves axially outwardly in response to the axially outward movement of the flexible hose. This increases the frictional force exerted by the grip ring 334 on the flexible hose.

At the time of assembly, tube support 315 is pressed tightly against the sealing surface of seal 304 and then the housing's lower end is coined over to form lip 302 to hold tube support 315 in place. The purpose of seal 304 is to prevent any air leakage from flowing around the base 344 of tube support 315 in case it is not properly swedged or coined and thereby allowing an air leak.

Although the invention has been described in detail with reference to certain preferred embodiments, variations and modifications exist within the scope and spirit of the present invention as described and defined in the following claims.

What is claimed is:

1. A hose coupling for securing a flexible hose member having a radially exteriorly facing exterior hose surface and a radially interiorly facing interior hose surface, the hose coupling comprising:

a first coupling unit including a housing, a tube support member and a seal, the tube support member including a tube portion for supporting the interior hose surface and a base portion fixedly coupled to the housing, and the seal being disposed between the housing and the tube support member such that the seal is encapsulated by the combination of the housing and the tube support member; and a grip/release mechanism for selectively retaining the hose, the grip/release mechanism being disposed between the tube portion of the tube support member and the housing and moveable relative to the first coupling unit, wherein the base portion of the tube support member further includes a grip/release mechanism release taper surface for radially moving the grip/release mechanism upon the application of an axially directed force.

2. The hose coupling of claim 1, wherein the tube portion of the tube support member includes a radially facing exterior surface land a first grip ring, the first grip ring being circumferentially disposed about the tube portion exterior surface for engaging the interior hose surface; and the grip/release mechanism includes an radially facing interior surface, a sealing grip ring and a barbed grip ring, the sealing grip ring being circumferentially disposed about the grip/release mechanism interior surface for sealingly engaging the exterior hose surface, and wherein the barbed grip ring is circumferentially disposed about the grip/release mechanism interior surface for grippingly engaging the exterior hose surface.

3. A hose coupling for securing a flexible hose member having a radially exteriorly facing exterior hose surface and a radially interiorly facing interior hose surface, the hose coupling comprising:

a first coupling unit including a housing, a tube support member and a seal, the tube support member including a tube portion for supporting the interior hose surface and a base portion fixedly coupled to the housing, and the seal being disposed between the housing and the tube support member such that the seal is encapsulated by the combination of the housing and the tube support member; and a grip/release mechanism for selectively retaining the hose, the grip/release mechanism being disposed between the tube portion of the tube support member and the housing and moveable relative to the first coupling unit;

wherein the tube portion of the tube support member includes a radially facing exterior surface and a first grip ring, the first grip ring being circumferentially disposed about the tube portion exterior surface for engaging the interior hose surface;

the grip/release mechanism includes an radially facing interior surface, a sealing grip ring and a barbed grip ring, the sealing grip ring being circumferentially disposed about the grip/release mechanism interior surface for sealingly engaging the exterior hose surface, and wherein the barbed grip ring is circumferentially disposed about the grip/release mechanism interior surface for grippingly engaging the exterior hose surface;

the base portion of the tube support member further includes a grip/release mechanism release taper surface; and movement of the grip/release mechanism toward the base portion of the tube support member causes a radially outwardly expansion of the grip/release mechanism through the interaction of the grip/release mechanism release taper surface and the grip/release mechanism.

4. The hose coupling of claim 3, wherein axial movement of the grip/release mechanism toward the base portion of the tube support member increases the axial separation between the sealing ring of the grip/release mechanism and the grip ring of the tube support member, for facilitating the introduction of the hose to the coupling into a space defined between the grip/release mechanism and the tube support member.

5. The hose coupling of claim 2, wherein
the housing further includes a radially inwardly facing ramped portion and the grip/release mechanism further includes a radially outwardly facing ramped portion, wherein the exertion of an axially outwardly directed force on the hose in a direction away from the coupling unit radially compresses the grip/release mechanism through the interaction of the ramped portion of the housing with the ramped portion of the grip/release mechanism, to more tightly grip the hose coupled to the coupling.

6. The hose coupling of claim 2, wherein the exertion of an axially outwardly directed force on the hose causes the barbed grip ring of the grip/release mechanism to more tightly grip the exterior surface of the hose.

7. The hose coupling of claim 2, wherein the exertion of an axially outwardly directed force on the hose reduces the axial separation of the sealing grip ring on the grip/release mechanism and the grip ring on the tube support member.

8. The hose coupling of claim 2, wherein the sealing grip ring of the grip/release mechanism includes an arcuately convex surface.

9. The hose coupling of claim 3, wherein the grip/release mechanism further includes an axially inner end, an axially outer end, a waist portion disposed between the axially inner and outer ends, and a plurality of axially extending slots forming the axially inner end and waist portion, wherein the slots facilitate the radial expansion of the grip/release mechanism.

10. A hose coupling for securing a flexible hose member having a radially outwardly facing exterior hose surface and a radially inwardly facing interior hose surface, the hose coupling comprising:
 a housing having a radially outwardly facing exterior surface and a radially inwardly facing interior surface defining a longitudinal passageway, a first axial end, and a second axial end; the interior surface including a first ramped portion and a first seating portion;
 a tube support member having a tube portion disposed in the interior longitudinal passageway of the housing and a base portion fixedly coupled to the housing at the second axial end of the housing,
  the base portion having a seal seat region, and
  the tube portion having a radially outwardly facing exterior surface that includes a first grip ring for supporting the interior hose surface, the first grip ring being circumferentially disposed about the exterior hose surface;
 a seal disposed between the first seating portion of the housing and the seal seat region of the tube support member; and
 a grip/release mechanism disposed in the longitudinal passageway of the housing concentrically exteriorly of the tube portion of the tube support member, the grip/release member being axially moveable relative to the housing and having a third axial end, a radially inwardly facing, axially extending interior surface defining an interior longitudinal passageway, and a radially outwardly facing, axially extending exterior surface,
  the grip/release member interior surface including a circumferentially disposed sealing grip ring and a circumferentially disposed barbed grip ring disposed toward the third axial end relative to the grip ring, wherein the sealing grip ring exerts a compressive force on the exterior hose surface and the barbed grip ring grips the exterior hose surface by exerting an expansive force, the grip/release mechanism exterior surface includes a second ramped portion, and the base portion of the tube support includes a taper surface for radially expanding the diameter of the grip/release mechanism upon application of an axially directed force on the grip/release mechanism.

11. A hose coupling for securing a flexible hose member having a radially outwardly facing exterior hose surface and a radially inwardly facing interior hose surface, the hose coupling comprising:
 a housing having a radially outwardly facing exterior surface and a radially inwardly facing interior surface defining a longitudinal passageway, a first axial end, and a second axial end; the interior surface including a first ramped portion and a first seating portion;
 a tube support member having a tube portion disposed in the interior longitudinal passageway of the housing and a base portion fixedly coupled to the housing at the second axial end of the housing,
  the base portion having a seal seat region, and
  the tube portion having a radially outwardly facing exterior surface that includes a first grip ring for supporting the interior hose surface, the first grip ring being circumferentially disposed about the exterior hose surface;
 a seal disposed between the first seating portion of the housing and the seal seat region of the tube support member; and
 a grip/release mechanism disposed in the longitudinal passageway of the housing concentrically exteriorly of the tube portion of the tube support member, the grip/release member being axially moveable relative to the housing and having a third axial end, a radially inwardly facing, axially extending interior surface defining an interior longitudinal passageway, and a radially outwardly facing, axially extending exterior surface,
  the grip/release member interior surface including a circumferentially disposed sealing grip ring and a circumferentially disposed barbed grip ring disposed toward the third axial end relative to the grip ring, wherein the sealing grip ring exerts a compressive force on the exterior hose surface and the barbed grip ring grips the exterior hose surface by exerting an expansive force, and
  the grip/release mechanism exterior surface includes a second ramped portion; wherein:
 the base portion of the tube support further includes an axially outwardly and radially outwardly facing grip/release mechanism release taper surface;
 the grip/release mechanism further includes a plurality of axially extending slots originating from the axial third end of the grip/release mechanism, the slots extending from the interior surface of the grip/release mechanism through to the exterior surface of the grip/release mechanism; and
 wherein the axial movement of the grip/release mechanism toward the first axial end of the housing causes a radial expansion of the grip/release mechanism through the interaction of the grip/release mechanism release taper surface and the grip/release mechanism.

12. The hose coupling of claim 11, wherein the radial expansion of the grip/release mechanism releases the engagement of the barbed grip ring with the exterior hose surface, thereby allowing the hose to move toward the second axial end of the housing.

13. The hose coupling of claim 10, wherein the interior surface of the housing further includes a radially inwardly and axially inwardly facing ramped portion and the exterior surface of the grip/release mechanism further includes a radially outwardly and axially outwardly facing ramped portion disposed in a generally opposed relation to the housing ramped portion, wherein the exertion on the hose of an axially directed force on the hose toward the second end of the housing radially compresses the grip/release mechanism through the interaction of the ramped portion of the housing with the ramped portion of the grip/release mechanism.

14. The hose coupling of claim 10, wherein the exertion of an axially directed force on the hose in a direction toward the second axial end of the housing causes the barbed grip ring of the grip/release mechanism to more tightly engage the exterior hose surface.

15. The hose coupling of claim 10, wherein the exertion of an axial force on the hose in a direction toward the second end of the housing
   (1) reduces the axial separation of the sealing grip ring on the grip/release mechanism and the grip ring on the tube support member; and
   (2) radially compresses the grip/release mechanism through the interaction of the ramped portion of the housing with the ramped portion of the grip/release mechanism;
the reduced axial separation and radial compression being cooperative to increase the force with which the coupling grips the hose.

16. The hose coupling of claim 10, wherein the sealing grip ring of the grip/release mechanism includes an arcuately convex surface.

17. A hose coupling for securing a flexible hose having a radially exteriorly facing exterior hose surface and a radially interiorly facing interior hose surface, the hose coupling comprising:
   a housing having an axially outer end, an axially inner end, a radially outwardly facing exterior surface; a radially inwardly facing interior surface including a first cylindrical portion, a first ramped portion, a first seating portion adjacent to the second axial end and a second seating portion, the first cylindrical portion, the first ramped portion, the first seating portion and the second seating portion of the radially inwardly facing interior surface defining at least, in part, an interior longitudinal passageway;
   a tube support member having a tube portion disposed in the interior longitudinal passageway of the housing and a base portion fixedly coupled to the housing at the axially inner end of the housing,
      the base portion including a taper surface, a seal seat region, an axially inner end and an axially outer end, wherein base portion the axially inner end includes a flange region, the flange region being disposed in the first seating portion of the housing,
      the tube portion including an axially outer end, an axially inner end coupled to the axially inner end of the base portion, and a radially outwardly facing exterior surface having a first grip ring, wherein the exterior surface supports the interior hose surface and the first grip ring is circumferentially disposed about the exterior surface of the tube portion for gripping the interior hose surface;
   a seal having a radially inwardly facing surface defining a longitudinal passageway, the seal being disposed between the second seating portion of the housing and the seal seat region of the tube support member; and
   a grip/release mechanism disposed in the interior passageway of the housing coaxially exteriorly of the tube portion of the tube support member and axially moveable relative to the housing, the grip/release mechanism having an axially outer end, an axially inner end, a radially inwardly facing, axially extending interior surface defining an interior longitudinal passageway, and a radially outwardly facing, axially extending exterior surface,
      the interior surface including a circumferentially disposed sealing grip ring and a circumferentially disposed barbed grip ring for exerting a compressive force on the flexible hose in response to the exertion of an axially outwardly directed force on the flexible hoses,
      the exterior surface of the grip/release mechanism including a first cylindrical portion, a waist portion and a first ramped portion, the axially inner end of the grip/release mechanism being engageable with the taper surface of the base portion of the tube support.

18. A hose coupling for securing a flexible hose having a radially exteriorly facing exterior hose surface and a radially interiorly facing interior hose surface, the hose coupling comprising:
   a housing having an axially outer end, an axially inner end, a radially outwardly facing exterior surface; a radially inwardly facing interior surface including a first cylindrical portion, a first ramped portion, a first seating portion adjacent to the second axial end and a second seating portion, the first cylindrical portion, the first ramped portion, the first seating portion and the second seating portion of the radially inwardly facing interior surface defining at least, in part, an interior longitudinal passageway;
   a tube support member having a tube portion disposed in the interior longitudinal passageway of the housing and a base portion fixedly coupled to the housing at the axially inner end of the housing,
      the base portion including a seal seat region, an axially inner end and an axially outer end, wherein the axially inner end includes a flange region, the flange region being disposed in the first seating portion of the housing,
      the tube portion including an axially outer end, an axially inner end coupled to the axially inner end of the base portion, and a radially outwardly facing exterior surface having a first grip ring, wherein the exterior surface supports the interior hose surface and the first grip ring is circumferentially disposed about the exterior surface of the tube portion for gripping the interior hose surface;
   a seal having a radially inwardly facing surface defining a longitudinal passageway, the seal being disposed between the second seating portion of the housing and the seal seat region of the tube support member; and
   a grip/release mechanism disposed in the interior passageway of the housing coaxially exteriorly of the tube portion of the tube support member and axially moveable relative to the housing, the grip/release mechanism having an axially outer end, an axially inner end, a radially inwardly facing, axially extending interior surface defining an interior longitudinal passageway, and a radially outwardly facing, axially extending exterior surface, the interior surface including a circumferentially disposed sealing grip ring and a circumferentially disposed barbed grip ring for exerting a compressive force on the flexible hose in response to the exertion of an axially outwardly directed force on the flexible hoses, the exterior surface of the grip/release mechanism including a first cylindrical portion, a waist portion and a first ramped portion, wherein the base portion of the tube support member further includes an axially outwardly and radially outwardly facing grip/release mechanism release taper;

the grip/release mechanism includes a plurality of axially extending slots originating from the axially inner end of the grip/release mechanism, the slots extending from the interior surface of the grip/release mechanism through to the exterior surface of the grip/release mechanism; and wherein an axially inwardly directed movement of the grip/release mechanism causes a radial expansion of the grip/release mechanism through the interaction of the grip/release mechanism release taper surface and the grip/release mechanism, the radial expansion being facilitated by the waist portion and the slots.

19. The hose coupling of claim 18, wherein the radial expansion of the grip/release mechanism facilitates the disengagement of the barbed grip ring from the exterior hose surface, thereby facilitating removal of the hose from the coupling.

20. The hose coupling of claim 17, wherein the housing further includes a radially inwardly facing ramped portion, the grip/release mechanism further includes a radially outwardly facing ramped portion, and the exertion of an axially outwardly directed force on the hose radially compresses the grip/release mechanism through the engagement of the ramped portion of the housing with the ramped portion of the grip/release mechanism.

21. The hose coupling of claim 17, wherein the exertion of an axially outwardly directed force on the hose increases the strength of the grip of the barbed grip ring of the grip/release mechanism on the exterior hose surface.

22. The hose coupling of claim 17, wherein the exertion of an axially outwardly directed force on the hose reduces the axial separation of the sealing grip ring on the grip/release mechanism and the grip ring on the tube support member.

23. The hose coupling of claim 17, whereas the housing stabilizes the grip/release mechanism through the interaction of the first cylindrical portion of the housing and the first cylindrical portion of the grip/release mechanism.

* * * * *